Aug. 25, 1964 R. C. MOORE 3,146,302

COLOR TELEVISION SYSTEM

Filed Jan. 11, 1952 3 Sheets-Sheet 1

INVENTOR
ROBERT C. MOORE
BY Dean V. Hostetter
ATTORNEY

INVENTOR
ROBERT C. MOORE
BY Allen V. Hazeltine
ATTORNEY

Aug. 25, 1964 R. C. MOORE 3,146,302

COLOR TELEVISION SYSTEM

Filed Jan. 11, 1952 3 Sheets-Sheet 3

INVENTOR
ROBERT C. MOORE
BY Allen V. Hazeltine
ATTORNEY

United States Patent Office 3,146,302
Patented Aug. 25, 1964

3,146,302
COLOR TELEVISION SYSTEM

Robert C. Moore, Erdenheim, Pa., assignor to Philco Corporation, Philadelphia, Pa., a corporation of Delaware Filed Jan. 11, 1952, Ser. No. 265,981
18 Claims. (Cl. 178—5.4)

Figure 1:
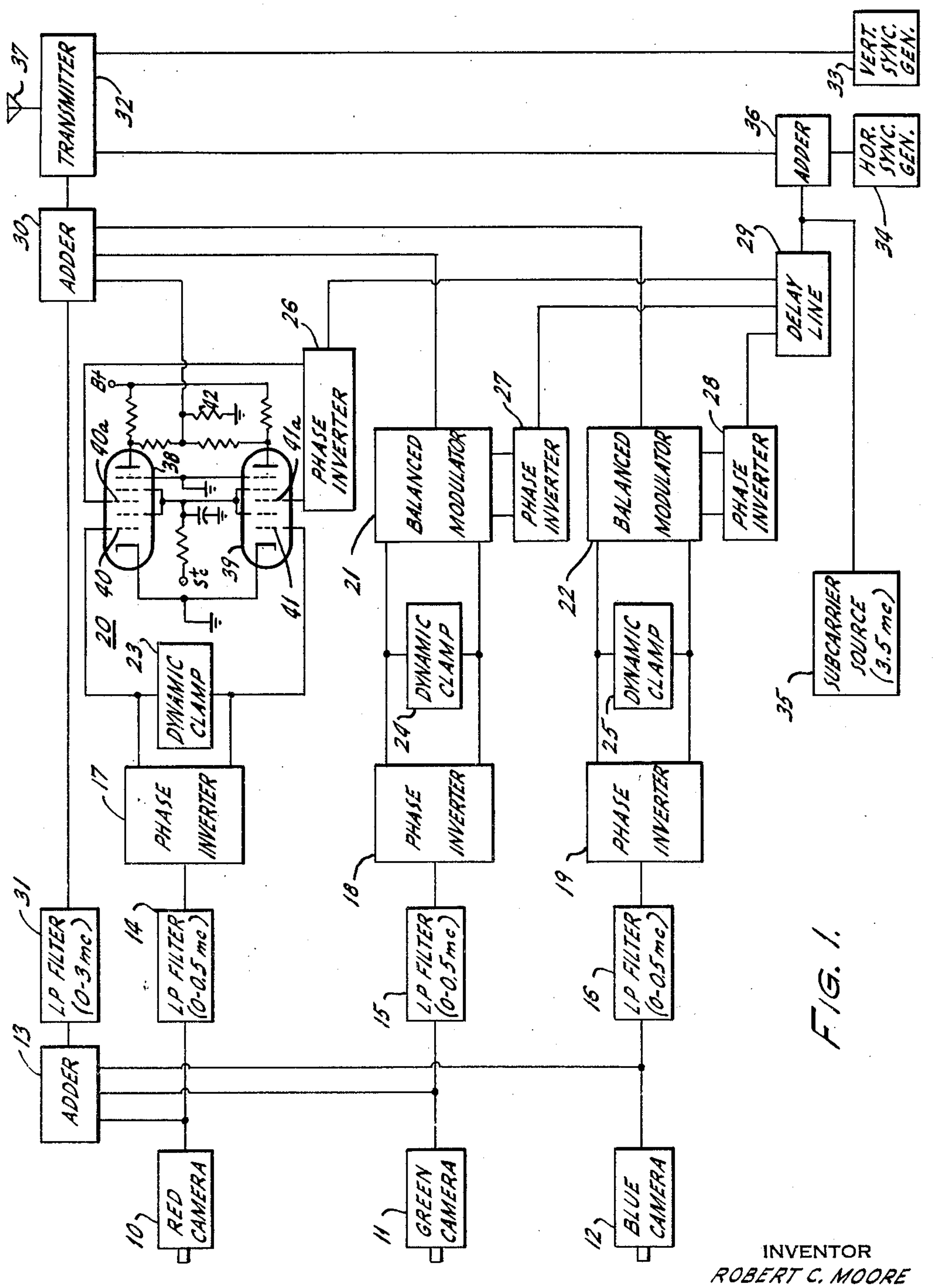

The present invention relates to color television systems and, more particularly, to improvements in so-called "compatible" color television systems which produce signals suitable for utilization in a standard monochrome receiver to form a conventional black and white picture of high quality.

It has been found, heretofore, that the reproduction of a colored televised image requires the transmission of a minimum of three different intelligence-representative signals. In some known systems, each of these signals is constituted by the output of one of three television cameras, respectively equipped with red, green and blue light transmissive filters and all scanning the same scene. In other systems, the taking characteristics of the cameras are so chosen that one camera produces an output signal proportional only to the luminosity of the televised scene, while the other two cameras produce signals respectively indicative of the chromaticity components of the televised scene.

To achieve compatibility, there is next formed, in systems of both these types, a signal which resembles, as nearly as possible, a conventional black-and-white television signal. In the first mentioned type of system this is done by additively combining equal fractions of the red, green and blue camera output signals, it having been found that a signal so constituted will produce an image, in a conventional black-and-white television receiver, which is so nearly the same as that produced by a conventional black-and-white signal derived from the same televised scene as to be a subjectively acceptable substitute therefor. A signal having these subjective characteristics will hereinafter be called a "monochrome signal" and the intelligence which it represents will be called "monochromatic intelligence."

In systems of the second aforementioned type, a satisfactory monochrome signal is directly available in the form of the luminosity-representative output signal of one camera.

In both types of systems, the monochrome signals occupy the lowest frequency range of the entire transmitted signal spectrum so that they can be utilized in the conventional manner by a black-and-white television receiver. The several chromaticity components, which must additionally be transmitted for use in color television receivers, also occupy this low frequency range at the outputs of the cameras by which they are produced. In order to prevent contamination of the monochrome signal by these chromaticity components, the latter are preferably transmitted in a different frequency range, although some overlap between the two ranges may be permissible. Furthermore, since several different chromaticity components must be transmitted at once, it is advantageous to apply bandwidth economy techniques to the handling of these components so as to make all of their intelligence available within the narrowest possible frequency range. This in turn permits allocation of the maximum fraction of the available spectrum to the monochrome signal so that maximum black-and-white definition is obtained.

For these reasons, it has been the practice, heretofore, to sample the different chromaticity components in cyclically recurrent succession and at a rate substantially in excess of the highest frequency of the monochrome band. The sampling operation is, in each case, carried out by an electronic switching device, such as a multigrid vacuum tube, whose anode current is normally maintained cut off by a suitable bias potential while the signal to be sampled is continuously applied to one of its control grids. At times when it is desired to sample this particular signal, a short positive pulse, of sufficient amplitude to overcome the negative bias, is applied to the biased grid and conduction proportional to the chromaticity signal amplitude takes place.

In the first-mentioned type of system, this sampling operation is recurrently applied to all three camera output signals, usually at equally spaced time intervals, thereby producing a series of spaced output pulses, every third one of which has a unidirectional amplitude representative of intelligence respecting one of the primary colors of the televised scene.

In the second type of system, the sampling operation is performed only on the two chromaticity-representative camera signals, thus producing a series of spaced output pulses, every other one of which has an amplitude represensative of one chromaticity component of the televised scene.

It is apparent that neither series of output pulses is suitable for combination with the corresponding monochrome component to form the final signal for transmission. The reason for this is that these pulses contain a great number of undesired frequency components, all of which are inevitably formed during the sampling operation. Particularly, the pulses contain components at the original frequencies of the chromaticity components, as derived from the cameras and prior to sampling. These must be eliminated because they lie within the same frequency range as the monochrome signal and would therefore contaminate the latter. Also, there are components at harmonic frequencies of these original chromaticity components, as well as at harmonic frequencies of the sampling pulse repetition rate. These must be eliminated because they increase unnecessarily the total range of transmitted signal frequencies beyond that strictly required to transmit all the monochromatic and chromaticity intelligence in separate bands.

Thus, the pulse samplers must be followed by bandpass filters arranged to eliminate all frequencies outside the range to be occupied by the desired components of the sampler outputs. Only after these precautions have been observed may the chromaticity components be combined with the monochrome component to form the composite signal suitable for transmission.

While, by application of the aforedescribed pulse sampling technique, there may be formed a composite signal including a monochrome component in one frequency band and a plurality of chromaticity components all in one different frequency band, this technique still leaves a great deal to be desired.

To begin with, the pulse sampling process inherently produces an output signal having the form of isolated pulses. As has been pointed out, these pulses contain a great number of frequency components which contribute nothing to the intelligence transmission process but whose presence contaminates the monochrome signal and extends the high frequency end of the required transmission band. For these reasons, the application of the pulse sampling technique to the transmission of several signals within the same frequency band also requires the use of elaborate filters for eliminating all of these undesired frequency components from the output signals of the samplers.

Furthermore, the pulse sampling process obviously requires the initial production of narrow rectangular pulses for use in actuating the samplers. Such pulses are constituted of a number of component signals whose frequencies range all the way from D.-C. to high harmonics of the pulse repetition rate. For example, to produce reasonably well defined pulses recurrent at the 3.5 megacycle rate commonly used in such pulse sampler arrangements, the pulse generator circuit must be able to produce at least the third harmonic of the fundamental pulse rate, or a signal of 10.5 megacycle frequency, as well as the lower frequencies all the way down to D.-C. Thus the pulse generator must have large bandwidth, and the same requirement applies to all the circuits which the pulses must traverse prior to their application to the pulse samplers. As it is uneconomical to provide a separate pulse generator for each sampler, it is the practice to provide means for applying the same pulses to all the samplers after introducing mutual phase displacement therebetween. Phase shifters capable of transmitting without distortion the wide range of pulse signal components of the prior art are especially costly and difficult to construct.

It is, accordingly, a primary object of the invention to provide a simplified compatible color television system.

It is another object of the invention to provide a color television ssytem adapted to produce a monochrome signal occupying a first frequency band and a plurality of chromaticity signals all occupying the same second frequency band, by substantially simplified techniques.

It is still another object of the invention to provide improved means, in a color television system, for combining a plurality of chromaticity signals, each occupying a predetermined frequency range, within a single frequency range no greater than twice said predetermined range.

It is a still further object of the invention to realize the aforementioned objects by the application of bandwidth economy techniques radically different from the pulse sampling techniques of the prior art.

Still another object of the invention resides in the application, to chromaticity signals, of improved bandwidth economy techniques utilizing only narrow band or even single frequency transmission circuits.

A still further object of the invention resides in the application, to color television chromaticity signals, of bandwidth economy techniques utilizing circuits which are inherently productive of only the desired output frequency components, thereby obviating the necessity of filtering out undesired frequency components prior to transmission.

It is a feature of the invention that means like those used to practice my improved bandwidth economy techniques may be used to reconstitute the original chromaticity siganls.

I have discovered that if a signal of substantially sinusoidal form, and of a frequency exceeding the highest frequency component of the monochrome signal representative of the brightness of a televised scene, as hereinbefore mentioned, is modulated by a chromaticity signal, of predetermined bandwidth comprising only those frequency components essential to the representation of a particular component of color intelligence, in such a manner that there is produced a sinusoidal signal whose excursions on both sides of its zero amplitude reference level are substantially equally affected by variations in the chromaticity signal, then this produced signal will occupy a band external to that of the monochrome signal and whose width does not exceed twice that of the original chromaticity signal. This result may be achieved using certain forms of balanced modulators well known in the art, without the need for the wide band circuits required to handle the pulse signals employed in the aforementioned prior systems and without the need for the additional filtering required to eliminate unnecessary signal components in these prior art systems. Furthermore, by providing a plurality of such signals of substantially sinusoidal form, but of differing phase, and by modulating each of such signals by a different chromaticity signal so that excursions of each produced sinusoidal signal on both sides of its zero amplitude reference level are substantially equally affected by variations in the modulating signal, there may be produced a plurality of signals, each occupying a common band external to that of the monochrome signal, whose width is no greater than twice the width of the band occupied by any of the original chromaticity signals and each of which contains the same intelligence as was contained in one of the original chromaticity signals. These signals may then be additively combined to yield a resultant signal containing all of the significant information contained in the several original chromaticity signals. This resultant signal may then be combined with the monochrome signal in the usual manner to yield a composite signal incorporating all of the information required to reproduce a televised scene in color.

By reason of the fact that the system, as just described, makes use of signals of sinusoidal or substantially sinusoidal form and, unlike the aforementioned prior art systems, does not depend on the use of wide band pulse signals, many of the complexities of the prior art circuits are eliminated. Furthermore, in the present system, it is unnecessary to provide filters of the sort employed in prior art systems for the purpose of eliminating extraneous signal components introduced by the prior art sampling process.

Figure 2:
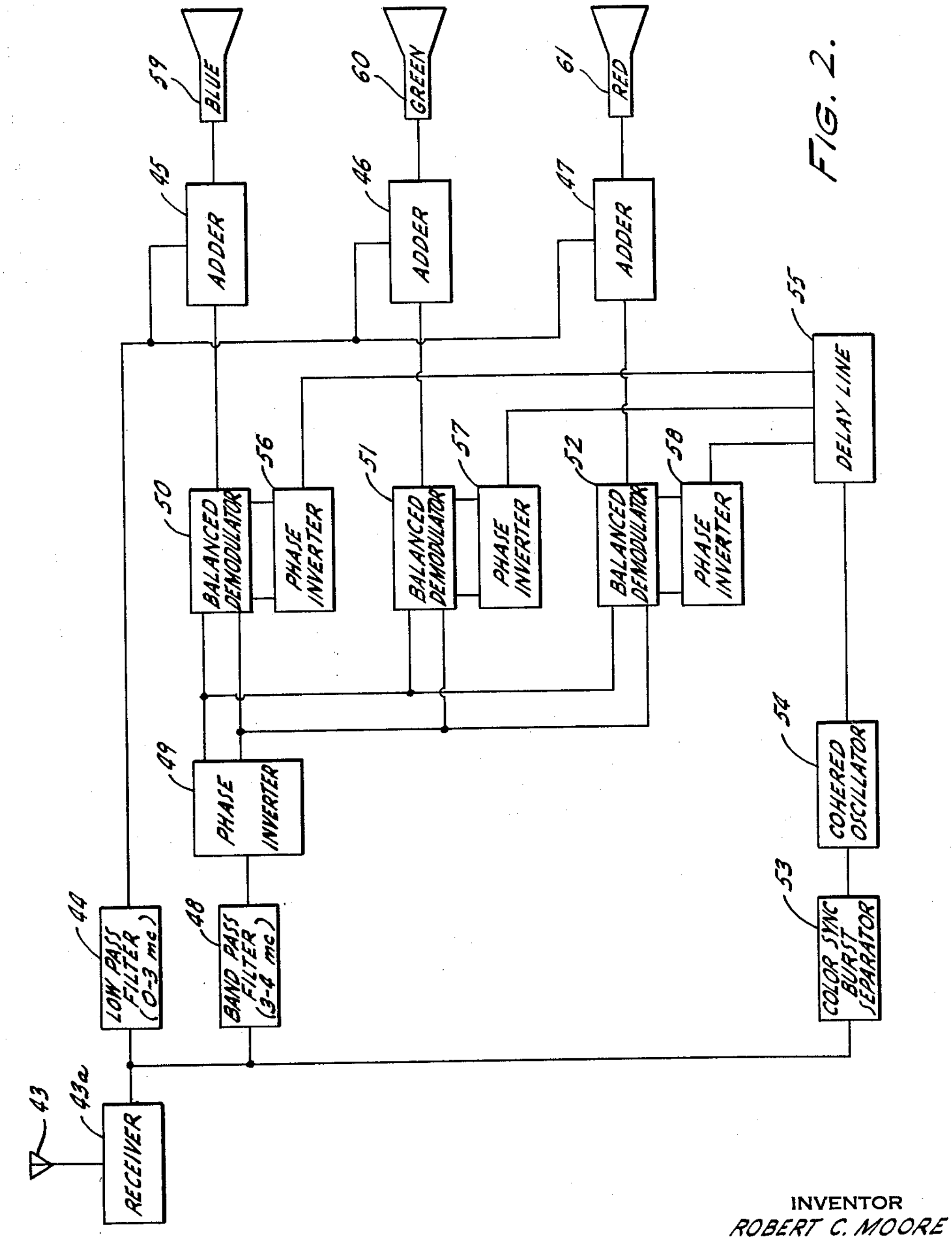
Figure 3:
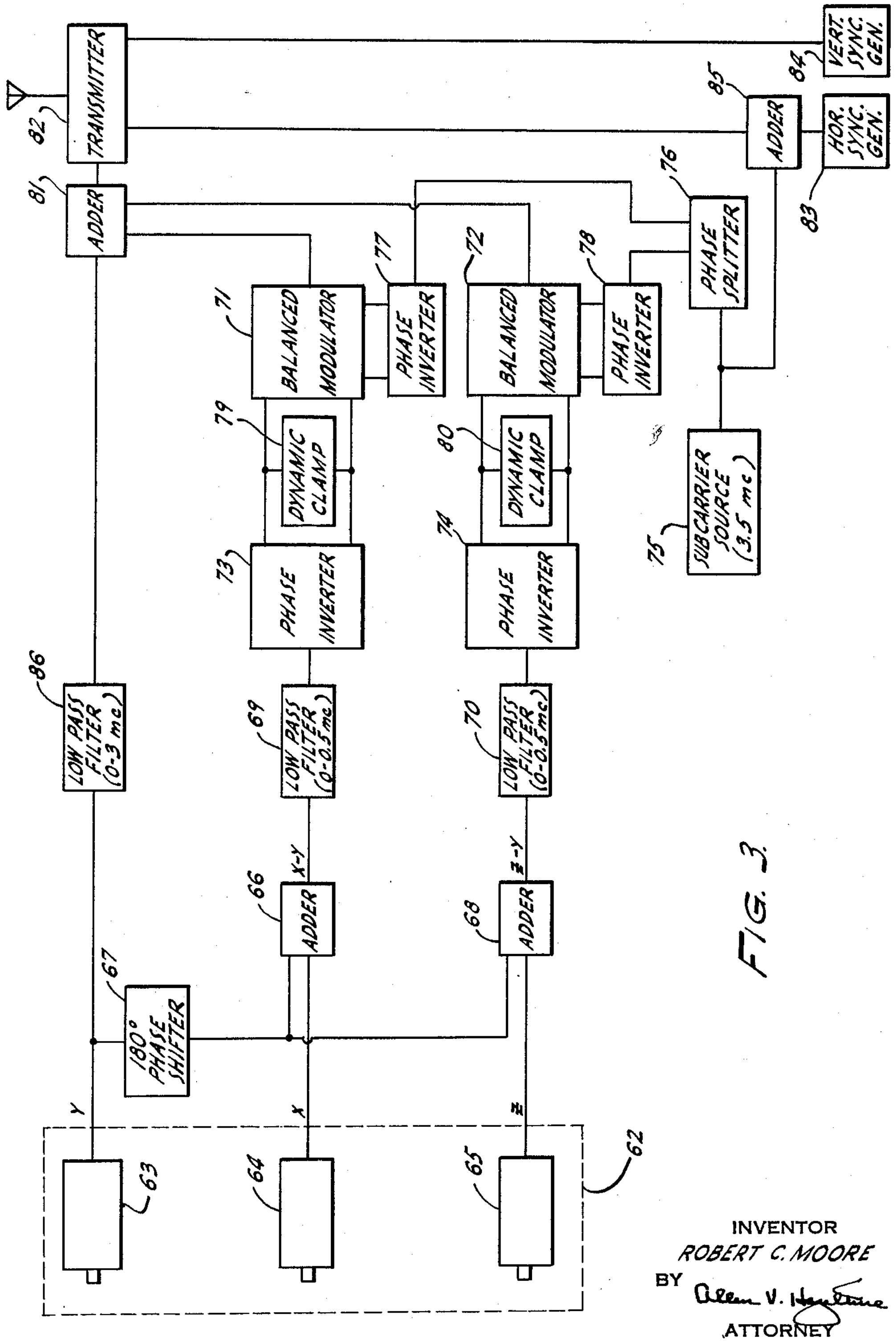

The particular construction and operation of typical embodiments of my invention is described in detail hereinafter, the description being supplemented by the accompanying drawings wherein:

FIGURE 1 illustrates a color television transmitter constructed and arranged to produce a compatible color television signal in accordance with my invention;

FIGURE 2 illustrates a particular type of color television receiver adapted to receive the signal produced by the transmitter of FIGURE 1 and to form a full color reproduction of the televised scene by the optical superposition of three differently colored images; and FIGURE 3 shows another color television transmitter arranged to produce a compatible television signal in accordance with my invention.

The transmitter system illustrated in FIGURE 1, to which more particular reference may now be had, comprises three television cameras, respectively designated by reference numerals 10, 11 and 12 and respectively equipped with red, green and blue light transmissive filters. The output circuits of these three cameras are all connected to an adding circuit 13 and are further separately connected to low-pass filters 14, 15 and 16, respectively. The output circuits of these low-pass filters are respectively connected to phase inverters 17, 18 and 19 whose output circuits are in turn respectively connected to balanced modulators 20, 21 and 22. Associated with each phase inverter-balanced modulator combination is a different so-called dynamic clamp circuit, the three dynamic clamp circuits being respectively designated by reference numerals 23, 24 and 25. The balanced modulators 20, 21 and 22 are also respectively connected to the output circuits of phase inverters 26, 27 and 28, which have their input circuits connected to different output terminals of a delay line 29. The output circuits of modulators 20, 21 and 22 are all connected to an adding circuit 30, this adding circuit being also connected to the output circuit of a low-pass filter 31 which, in turn, receives its input signal from the output of adder 13. The output circuit of adder 30 is connected to transmitter 32 which may include the conventional radio frequency oscillator and modulator circuits, together with suitable radio frequency power amplifiers. To this transmitter 32, there are also supplied the outputs from vertical synchronizing generator 33 and from adder 36 which operates to combine the outputs from horizontal synchronizing generator 34 and from a sub-carrier source 35. The output signal from sub-carrier source 35 also constitutes the input signal to delay line 29. The signals supplied to transmitter 32 from the circuit components hereinbefore enumerated are broadcast from antenna 37 after suitable frequency modification and amplification in the conventional manner by the transmitter.

In operation, the red, green and blue cameras 10, 11 and 12 are all arranged to observe simultaneously the same scene to be televised. These cameras are made to scan the scene in synchronism. Then, owing to the differently colored light transmissive filters with which they are equipped, there will appear at the output of the red camera a video signal whose magnitude is proportional to the intensity of the red component of successively scanned portions of the scene. Similarly, the green camera 11 will produce an output signal whose magnitude is indicative of the green light intensity of the televised scene, while the blue camera 12 will produce an output signal representative of the blue light emissive components of the scene. As previously indicated, there is formed, first of all, a so-called monochrome signal from these camera outputs, this being a signal which is suitable for direct application to a standard monochrome television receiver to reproduce a black-and-white image of the televised scene. In the particular system illustrated in FIGURE 1 this is accomplished by deriving equal fractions of the outputs from each of the three cameras and additively combining these derived fractions. This function is performed by adding circuit 13 which may be of any conventional form. In order to achieve substantial mutual exclusion between the frequency bands occupied by this monochrome signal and the signals yet to be formed representative of the chromaticity of the televised scene, the signals produced by adder 13 are preferably confined, by means of low-pass filter 31, to a predetermined low-frequency band extending, for example, from 0 to 3 megacycles.

For the purpose of producing the aforementioned signals representative of the chromaticity of the televised scene, the outputs from the three cameras are first separately passed through low-pass filters which are preferably operative to limit their individual bandwidths to the 0 to 0.5 megacycle range. It is apparent that this will eliminate, from each of the camera output signals, those frequency components representative of the fine detail of the image. This is permissible because it has been found that the eye is sensitive to color changes only over relatively large areas. Consequently, chromaticity information need be provided only for a relatively low frequency range compared to the range of the monochrome signal to whose rapid variations the eye is much more sensitive. The output signals of these low-pass filters, which constitute the 0 to 0.5 megacycle components of the red, green and blue camera signals, respectively, are now separately supplied to the balanced modulators 20, 21 and 22. Since these modulators may all be of substantially identical construction, only one of them, namely modulator 20, is shown and described in detail, the others being diagrammatically represented by suitably labeled rectangles. This modulator 20 is seen to comprise a pair of pentagrid vacuum tubes 38 and 39, connected in parallel between ground and a source of anode potential B+, and each having a pair of control grid electrodes 40, 40*a* and 41, 41*a*, respectively. Conventional connections to a source of screen grid potential Sc+ from the screen grids and to ground from the suppressor grids are also provided. The output signals of the two tubes are additively developed across output resistor 42. Such a modulator is illustrated in FIGURE 11.26 on page 416 of volume 19 of the Massachusetts Institute of Technology Radiation Laboratory Series, published 1949, by McGraw-Hill Book Co., Inc., New York.

Considering now in detail the path followed by the output signal from one of these filters, say filter 14, it will be noted that this signal is first supplied to a phase inverter 17. This is for the purpose of deriving therefrom a pair of signals each substantially identical in form to the output signal from filter 14 but of mutually opposite phase. Circuits which will perform this function are well known in the art and therefore need not be described in detail here. For a description of various embodiments thereof, reference may be had to pages 301 and 302 of "Radio Engineering" by F. E. Terman, published 1947, by the McGraw-Hill Book Co., Inc. One of the output signals produced by phase inverter 17 is then supplied to the control grid electrode 40 of the multi-grid vacuum tube 38 which, as indicated, forms one half of balanced modulator 20. The other output signal of phase inverter 17 is simultaneously supplied to control grid electrode 41 of the multi-grid vacuum tube 39 which forms the other half of this balanced modulator 20. The signal derived from the output circuit of low-pass filter 14, for application to phase inverter 17 as hereinbefore described, contains frequency components which may extend all the way down to zero frequency or D.-C. Such D.-C. components are lost by the action of those phase inverter circuits of which I have knowledge and they must, therefore, be restored prior to application of the phase inverter output signals to the control grid electrodes of the balanced modulator tubes. This is accomplished by the dynamic clamp circuit 23 which is connected across the output terminals of phase inverter 17 and which is operative to maintain the blanking levels of the output signals from phase inverter 17 at fixed predetermined values despite variations in the D.-C. level of these signals due to picture information. The dynamic clamp here employed constitutes, in effect, a gated clamping device which is rendered operative only during the horizontal blanking intervals to clamp the phase inverter output signals at predetermined reference values at such times. Arrangements of this type are well known in the art and are, for example, described in detail in U.S. Patent No. 2,299,945 to K. R. Wendt for a "Direct Current Reinserting Circuit." Accordingly, no detailed description of this circuit, beyond the foregoing indication of its function, is needed here. Thus, by the action of phase inverter 17 followed by that of dynamic clamp 23, there are supplied, to the control grids 40 and 41 of tubes 38 and 39 of the balanced modulator 20, signals which are each substantially identical to that produced at the output of low-pass filter 14 but which are of opposite phase. To control grid electrodes 40*a* and 41*a* of tubes 38 and 39 there is applied another pair of signals also of opposite phase and derived from phase inverter 26. This phase inverter 26 may also be of any conventional form and may, for example, be substantially similar to phase inverter 17. Its input signal, however, is derived from an output terminal of delay line 29 whose input signal, in turn, is constituted by the output signal of sub-carrier source 35. Thus the input signal to phase inverter 26 will bear a predetrmined phase relationship to the output signal from sub-carrier source 35 as determined by the length of delay line path traversed by the latter signal prior to arrival at the phase inverter-connected terminal. In accordance with the invention, this sub-carrier source 35 is preferably constituted by a sine wave oscillator operative to produce a substantially constant single frequency signal. Again for the sake of obtaining substantial mutual exclusion between the frequency bands occupied by the monochrome signal and by the chromaticity components and also for the purpose of transmitting all of these latter components within a frequency band of minimum width consistent with the transmission of all their essential information, this sub-carrier source preferably operates at a frequency which exceeds that of the upper end of the monochrome signal passband by approximately the width of the passband of low-pass filter 14. With the illustrative values hereinbefore assumed, the oscillator constituting subcarrier source 35 is then preferably arranged to produce a sine wave of 3.5 megacycle frequency. This is then the signal which is applied to delay line 29 along which it propagates past the three spaced output terminals to which phase inverters 26, 27 and 28, are respectively connected. Thus, the signal supplied to the input circuit of phase inverter 26 will also be a sine wave of 3.5 megacycle frequency. Furthermore, it will preferably be in phase with the signal actually produced by sub-carrier source 35. Consequently, the two signals of opposite phase produced by phase inverter 26 will include one sine wave of 3.5 megacycle frequency in phase with the sub-carrier source output signal and another sine wave of the same frequency and in phase opposition to the output signal of sub-carrier source 35. One of these output signals of phase inverter 26 is now applied to control grid electrode 40*a* of vacuum tube 38. The other output signal of phase inverter 26, on the other hand, is supplied to control grid electrode 41*a* of tube 39. It does not matter which output signal from phase inverter 26 is applied to which vacuum tube. The important consideration is that the two vacuum tubes 38 and 39, which constitute the balanced modulator 20, be supplied with a 3.5 megacycle sub-carrier signal in push-pull and with the 0 to 0.5 components of the red camera output signal, also in push-pull. As a result, there will appear in the anode circuit of tube 38 a 3.5 megacycle sine wave signal whose amplitude will vary in accordance with variations in the magnitude of the low frequency red camera output components applied thereto. In the anode circuit of tube 39, on the other hand, there will appear a 3.5 megacycle sine wave signal of opposite phase to that in the anode circuit of tube 38 and whose amplitude varies inversely relative to the amplitude variations of the sine wave signal in the anode circuit of tube 38. This inverse relationship in the amplitudes of the two sine waves is, of course, due to the inverse phase relationship of the camera signal components applied to the two tubes, for, as the camera signal applied to vacuum tube 38 becomes more positive and increases the gain of the vacuum tube and with it the amplitude of its anode circuit sine wave, the camera signal applied to tube 39 is driven correspondingly more negative, thereby decreasing the gain of tube 39 and with it the amplitude of the sine wave in its anode circuit. There is therefore developed, across output resistor 42, a signal proportional to the sum of the individual anode circuit signals of the two tubes. When each of tubes 38 and 39 are operating on the substantially linear portions of their grid voltage anode current characteristics, the sum signal developed across output resistor 42 will be a sine wave signal of 3.5 megacycle frequency whose positive and negative excursions from its zero amplitude reference level are substantially equal and proportional to the unidirectional magnitude variations of the red camera output signal components. Furthermore, when the camera output signal is zero, as for example when the televised scene contains no red components, then the anode signals of both tubes will be of equal magnitude and opposite phase, so that their combined output signal will be zero.

In other words, the output signal of the balanced modulator will be a kind of carrier suppressed signal of 3.5 megacycle nominal frequency, double sideband modulated with the 0 to 0.5 megacycle components of the red camera output signal. This signal produced by the balanced modulator 20 will be particularly characterized in that it lacks substantially all components outside the $3.5 \pm 0.5$ megacycle frequency range.

Note particularly that this output signal of balanced modulator 20 is now in the desired form for the chromaticity components which are to be transmitted and that its production has, in accordance with the invention, required neither the circuits capable of handling the extremely wide sampling pulse spectra of prior art arrangements, nor the complex filtering arrangements needed at the output of prior art pulse samplers to remove undesired frequency components generated therein. It will be understood that imperfect operation of the balanced modulator tubes may cause signal components of undesired frequency to appear at the output of the balanced modulator. However, these components will generally be so much smaller than the desired components that their elimination by appropriate filters presents no serious problem. It will also be understood that the particular arrangement of balanced modulator 20 hereinbefore described does not constitute an essential feature of the invention. Instead, there may be substituted therefor, without departing from my inventive concept, any other circuit arrangement adapted to be supplied with the sine wave signal from sub-carrier source 35 and the output signal of low-pass filter 14 and responsive thereto to produce a sine wave signal whose positive and negative excursions from their zero amplitude reference level are equal and determined by the magnitude of the output signal from filter 14.

Inasmuch as the arrangement and operation of balanced modulators 21 and 22 may be substantially the same as that of balanced modulator 20 hereinbefore described in detail, no separate description thereof is required. The same applies to the phase inverters 18, 19, 27 and 28 as well as to the dynamic clamps 24 and 25 associated therewith. Suffice it to say that phase inverter 27 is supplied with a 3.5 megacycle sine wave signal from sub-carrier source 35 by way of a second terminal on delay line 29 so that its phase differs from that of the sine wave signal supplied to phase inverter 26 by an amount determined by the additional length of delay line traversed prior to arrival at its phase inverter connected terminal. Similarly, phase inverter 28 is supplied with a 3.5 megacycle sine wave signal from sub-carrier source 35 whose phase is still further delayed by passage through an additional portion of delay line 29. In practice, the output terminals of the delay line are preferably so spaced that the three signals respectively supplied to the different phase inverters bear mutual 120 degree phase relationships. Balanced modulator 21 is then operative to produce a 3.5 megacycle sine wave output signal differing by 120 degrees in phase from the sine wave output signal produced by modulator 20 and having equal positive and negative excursions about its predetermined zero amplitude reference level which are proportional to the unidirectional magnitude of the 0 to 0.5 megacycle components of the green camera output signal. Likewise, balanced modulator 22 is operative to produce a 3.5 megacycle sine wave signal bearing 120 degree mutual phase relationship to the output signals of each balanced modulators 20 and 21 and having equal positive and negative excursions about its zero amplitude reference level corresponding to the magnitude of the 0 to 0.5 megacycle frequency components of the blue camera output signal.

The three modulator output signals thus produced as well as the output of low-pass filter 31, are supplied to adding circuit 30 which may, for example, be of the form illustrated in FIGURE 18.1 on page 631 of the aforementioned volume 19 of the Massachusetts Institute of Technology Radiation Laboratory Series. There they cooperate to form the desired composite signal having an average value representative of monochromatic intelligence and a 3.5 megacycle sinusoidal ripple superimposed thereon, the latter having amplitude and phase characteristic representative of the chromaticity of the televised scene. This composite monochrome and chromaticity signal is then supplied to transmitter 32 where it is combined with appropriate horizontal and vertical synchronizing signals and readied for radiation from antenna 37 in conventional manner. There is also derived, from sub-carrier source 35, a 3.5 megacycle sine wave signal bearing predetermined constant phase relationship to all of the three sinusoidal signals produced by modulators 20, 21 and 22. A short burst of this sinusoidal signal is superimposed upon each horizontal blanking pulse immediately following the horizontal synchronizing pulse which occupies the leading portion of the blanking pulse. This burst of sinusoidal signal is known as a color synchronizing burst and serves to establish a phase reference with respect to which phase variations in the 3.5 megacycle ripple of the composite video signal may be interpreted. Accordingly, this color synchronizing burst is also supplied to tranmitter 32 and is included in the composite signal finally radiated from the antenna 37.

It will be understood that the signal produced for transmission in the aforedescribed manner is now immediately suitable for reception by a present-day standard black-and-white television receiver and for application, after suitable frequency reduction to the video frequency range, to the beam intensity control electrode of its cathode ray tube. When so utilized, the monochrome components of the signal will cause reproduction of the desired black-and-white image by this receiver cathode ray tube, whereas the chromaticity components, located in the 3 to 4 megacycle frequency range, will produce rapidly varying small area brightness changes which are quite tolerable from the subjective point of view of the observer. If desired, these chromaticity components may be entirely eliminated by simply incorporating a 3 to 4 megacycle band suppression filter in the path of the video signal proceeding the cathode ray tube.

The composite signal produced by the system of FIGURE 1 is also suitable for application to color television receivers for the purpose of reproducing the televised scene as a full color image. A particular television receiver system suitable for reception of this composite signal and for the production of an image in full color therefrom is illustrated in FIGURE 2 of the drawings to which particular reference may now be had. As will be seen, this system is constructed so as to take advantage of certain aspects of my novel bandwidth economy technique to minimize its passband and filtering requirements.

Such a complete receiver system may include a suitable television antenna 43 which intercepts the signals radiated from the transmitter antenna 37 and supplies them to a receiver **43*a*, which may comprise the usual and conventional receiver circuits, such as a radio frequency amplifier, a local oscillator and a frequency converter customarily employed in amplifying and reducing the frequency of the received television signal to its lowest or video range. At the output of receiver 43*a* there will then appear a composite video signal substantially identical to that present at the output of adder 30** of FIGURE 1 and including monochrome and chromaticity components interspersed, of course, at the usual time intervals with horizontal and vertical synchronizing pulses and with the color synchronizing bursts associated therewith.

The output of this receiver **43*a* is supplied to three separate signal channels. Of these, the first includes a low-pass filter 44 whose output is supplied to each of three adding circuits 45, 46 and 47. The second signal channel comprises a bandpass filter 48 whose output is supplied, by way of phase inverter 49, to each of three balanced demodulators 50, 51 and 52. The third and last signal channel comprises a color synchronizing burst separator 53, a cohered oscillator 54 and a delay line 55 having three spaced output terminals. These three output terminals of the delay line are respectively connected to the input circuits of phase inverters 56, 57 and 58 whose output circuits are respectively connected to balanced demodulators 50, 51 and 52. The output circuits of the balanced demodulators are, in turn, respectively connected to the input circuits of adders 45, 46 and 47. Finally the output circuit of adder 45 is connected to the beam intensity control grid of a blue light emissive cathode ray tube 59, while the output circuit of adder 46 is connected to the grid of a green light emissive cathode ray tube 60 and the output circuit of adder 47 is similarly connected to a red light emissive cathode ray tube 61**.

The structural and operational details of the system are as follows: Low-pass filter 44 is constructed so as to transmit video signal components in the 0 to 3 megacycle frequency range so that, at its output, there is available the monochrome signal formed by the transmitter. This output signal is supplied to all three cathode ray tubes through the adding circuits 45, 46 and 47 respectively. Thus the cathode ray tubes produce equal light outputs in blue, green and red in response to these frequency components of the monochrome signal. The chromaticity signal components produced at the transmitter, and which have been shown to occupy the 3 to 4 megacycle frequency band, are separated from the monochrome components by bandpass filter 48 which is arranged to transmit 3 to 4 megacycle frequency components to the substantial exclusion of signals at all other frequencies. Thus there is available, at the output of bandpass filter 48, the combined chromaticity signal produced by the additive combination of the sinusoidal output signals of modulators 20, 21 and 22 of FIGURE 1. This chromaticity signal is now demodulated in three separate balanced demodulators 50, 51 and 52. For this purpose, the output from bandpass filter 48 is first supplied to phase inverter 49 where it is transformed into two separate signals each of substantially identical form to that of the output signal from bandpass filter 48 but having mutually opposite phases. Each of the three balanced demodulators 50, 51 and 52 may be substantially similar in its construction to any one of the balanced modulators 20, 21 and 22 of FIGURE 1. Hence they require no detailed description here. To each of these balanced demodulators, there are supplied the two oppositely phased signals from phase inverter 49. However, in the present circuit, unlike that of FIG. 1 no dynamic clamp is required between the phase inverter and the balanced demodulators, for now the output signals of the phase inverter have no zero frequency or D.–C. components, so that no D.–C. restoration is necessary prior to their application to the balanced demodulators. The other signal applied to each of the demodulators is a 3.5 megacycle sine wave derived from phase inverters 56, 57 and 58 respectively.

The production of this demodulating sine wave involves the separation of the color synchronizing bursts from the remainder of the video signal by separator circuit 53. This latter may, for example, comprise a narrow bandpass filter transmissive only of 3.5 megacycle signals and preceded by gating circuits so arranged as to be signal transmissive only upon the application of a blanking pulse, thereby effecting separation between the color synchronizing burst pedestaled upon the blanking pulse and other video components of the received signal. The color synchronizing burst thus separated is utilized to drive cohered oscillator 54 which operates to produce a continuous sinusoidal signal locked in frequency and phase with the color synchronizing bursts. Thus the output of the signal from cohered oscillator 54 will be a sinusoidal signal having exactly the same frequency and phase as the output of sub-carrier source 35 of FIGURE 1. This signal is supplied to delay line 55 having three output terminals so spaced as to produce output signals having the same phase relations as the mutually phase displaced signals produced at the three output terminals of delay line 29 of FIGURE 1. In the illustrative case under consideration these output terminals of delay line 55 would be so spaced as to produce mutually 120 degree phase displaced signals. These are the signals which are applied respectively to the input circuits of phase inverters 56, 57 and 58, where they produce pairs of output signals in opposite phase relationship, the output signals of one phase inverter bearing to those of the other phase inverters the same 120 degree phase relationship.

The balanced demodulators are responsive to the signals thus supplied thereto to produce output signals which are predominantly of the respective forms of the 0 to 0.5 megacycle camera signals supplied to those modulators at the transmitter to which similarly phased 3.5 megacycle modulating waves were also applied. Thus, balanced demodulator 52 of FIGURE 2 will be operative to produce an output signal whose predominant characteristics are those of the 0 to 0.5 megacycle components of the red camera output at the transmitter. Similarly, demodulator 51, which is supplied with a signal from delay line 55 bearing the same phase relation to the output signal of cohered oscillator 54 as the signal supplied to modulator 21 of FIGURE 1 bears to the output of sub-carrier source 35 also of FIGURE 1 will produce a difference frequency heterodyne output signal predominantly of the form of the 0 to 0.5 megacycle components of the green camera output at the transmitter. The remaining receiver demodulator 50 will then produce a low frequency heterodyne component corresponding predominantly to the 0 to 0.5 megacycle component of the blue transmitter camera.

Thus the demodulators at the receiver perform essentially the inverse function of the modulators at the transmitter. Whereas the latter heterodyne the 3.5 mc. sub-carrier signal with a low-frequency intelligence representative signal, the former serve to heterodyne a similar 3.5 mc. sub-carrier signal with a signal which differs therefrom only by the same low frequency intelligence modulation. In either case, the desired process is a purely multiplicative one, so that the particular type of balanced modulator supplied in push-pull with sine wave sub-carrier signal which is used at the transmitter to achieve the objects of the invention may also be used to advantage at the receiver where it will produce the desired heterodyne frequency components without yielding either the unnecessary intelligence modulated sub-carrier or the unnecessary locally generated sub-carrier signals in its output.

The final step in the operation of the receiver consists of combining the several demodulator output signals with the monochrome signal from low pass filter 44 and supplying the appropriate resultant signals to the proper cathode ray tubes. Thus, the output of demodulator 52 is supplied, through adding circuit 47, to the red light emissive cathode ray tube, while the output of demodulator 51 is supplied to the green light emissive cathode ray tube and that of demodulator 50 to the blue light emissive cathode ray tube.

As has been explained, the output signals of the different demodulators correspond predominantly to the different chromaticity components derived from the transmitter cameras. The reason why they do not correspond exactly to these components is that the demodulation process will produce a certain amount of cross-talk between the chromaticity signal which is predominantly selected and the other two components present, with different phases, in the 3 to 4 megacycle signal range. However by virtue of the aforementioned 120 degree phase relationship imparted to these components at the transmitter, demodulation at the receiver in the same phase relationship will produce undesired demodulation components due to cross-talk which are just sufficient to cancel, upon addition, those 0 to 0.5 megacycle components of the monochrome signal which are representative of the same undesired components.

There will then appear on the screen of the red light emissive cathode ray tube a red image whose large area variations are proportional to variations in the intensity of the red light components only of the televised scene. Similarly, on the green cathode ray tube screen, there will appear large area light variations proportional only to the green components of the televised scene, and on the blue cathode ray tube therewill appear variations produced only by the blue components of the televised scene. When the three images produced by the three different cathode ray tubes are optically superimposed and simultaneously viewed, large areas of the image will be properly colored in accordance with the coloration of the televised scene, while small areas will have only brightness variations corresponding to those of the televised scene, as a result of the simultaneous application to all three cathode ray tubes of the high frequency components of the monochrome signal. However, as has been previously indicated, the eye is relatively insensitive to small area color changes while being relatively sensitive to small area brightness changes. As a result, the final image will appear to have substantially the same coloration and brightness as the televised scene. The manner of effecting the aforementioned optical superposition of the images separately formed on the three cathode ray tube screens is well known and need therefore not be illustrated here.

As previously pointed out, my novel sine wave-balanced modulation technique is applicable to a variety of compatible color television systems. Thus, for example, it is applicable to a system of the second general type hereinbefore briefly described, which is characterized by the production of a monochrome component directly by one of the cameras and by the production of complementary chromaticity components by the other two cameras. The manner in which its advantageous characteristics are utilized in this latter type of system will be apparent from the description of FIGURE 3 which follows.

Referring now to FIGURE 3, the embodiment there shown comprises a color image pickup camera system 62 adapted to resolve the image to be televised into three color component signals, and which, for simplicity and clarity, has been shown to be constituted by individual camera units 63, 64 and 65. In accordance with conventional practice in this type of system, the three signals derived from the camera system 62 are so correlated that one of the signals is proportional to the energy distribution of the light emitted by the image as weighted by a color mixture curve having a shape and ordinate scale substantially identical to the shape and ordinate scale of the curve of the relative luminosities of spectral colors to the eye, and the second and third signals are proportional to the image light energy distribution as weighted by second and third color mixture curves complementing, and defining with the first color mixture curve, the chromaticity of the image. In the system shown in FIGURE 3, the above-mentioned first signal may be produced by camera unit 63 having a spectral response proportional to the spectral luminosity characteristic of the eye and produced, for example, by means of an appropriate light filter arranged in the optical path of the camera unit and having a spectral transmission characteristic corresponding to the $\bar{y}$ curve as established by the International Commission on Illumination and referred to in "Principles of Physics" by F. W. Sears, published in 1946 by Addison Wesley Press, Inc., of Cambridge, Massachusetts, on page 305 et seq. Since the transmission characteristic corresponding to this curve $\bar{y}$ is identical to the curve of the relative luminosities of the spectral colors to the eye, the signal produced by the camera unit 63 embodies all of the brightness information contained in the image. Accordingly, this signal alone is sufficient to produce a truly panchromatic image when applied to a monochrome receiver.

In order to provide second and third signals necessary to establish the chromaticity of the image, the camera units 64 and 65 are given spectral transmission characteristics which complement the spectral transmission characteristic of the camera unit 63. While relatively wide freedom is permissible in the selection of the spectral characteristic in the camera units 64 and 65, in the preferred embodiment of the invention the transmission characteristics of the camera units 47 and 48 conform to color mixture curves having solely positive distribution coefficients and having shapes and ordinates scales substantially identical to the color mixture curves established by the International Commission on Illumination as being complementary to the above-noted curve $\bar{y}$. These complementary color mixture curves are known as curves $\bar{x}$ and $\bar{z}$ in conformance with the nomenclature established by the International Commission on Illumination.

The design of suitable optical filters for imparting spectral response characteristics to camera units 63, 64 and 65 in conformance with the curves $\bar{y}$, $\bar{x}$ and $\bar{z}$ is well known to those skilled in the art. For the sake of completeness, however, reference is made to the National Bureau of Standards Circular No. C429 of July 30, 1942, entitled "Photoelectric Tristimulus Colorimetry with Three Filters," by R. S. Hunter, and disclosing design factors for such filters.

The three signals respectively produced by camera units 63, 64 and 65 in accordance with the foregoing principles have been designated as Y, X, and Z in FIGURE 3. Thus, the signal Y is representative of the entire brightness information contained in the image while signals X and Z are respectively representative of the two complementary types of chromaticity information contained in the image and needed to define completely its brightness and coloration parameters. As has been the practice heretofore, signal Y from the camera unit 63 is combined with each of the signals X and Z from the camera units 64 and 65 respectively, to produce two difference signals $(X-Y)$ and $(Z-Y)$. More particularly, the signal from camera unit 63 is applied to an adder 66 through a 180 degree phase shifter 67 together with a signal from camera unit 64 to produce a first difference signal indicated as $(X-Y)$. In similar fashion, the signal from phase shifter 67 is applied to an adder 68, together with a signal from camera unit 65 to produce a second difference signal $(Z-Y)$. Since the signal Y from camera unit 63 contains all of the detailed brightness information of the image to be televised and only a relatively small amount of information concerning chromaticity is required by the eye, the signals from adders 66 and 68 may be restricted in their frequency range without significant visual deterioration of the color image at the receiver. To this end, low-pass filters 69 and 70, each having a maximum passband of the order of 0.5 megacycle, may be included in the output circuits of these adders 66 and 68 respectively. The two band limited color difference signals thus produced are now respectively supplied to the input circuits of two balanced modulators 71 and 72 by way of phase inverters 73 and 74 respectively. In accordance with the invention, these balanced modulators are operative to modulate respectively sine wave signals of equal frequency but differing in phase by 90 degrees. These quadrature phase related signals are derived from a single signal produced by sub-carrier source 75 whose output is supplied to a phase splitter 76 which is conventionally arranged to produce two separate output signals bearing the aforementioned quadrature phase relationship to each other and also having predetermined constant phase relation to the output of sub-carrier source 75. One of the output signals of this phase splitter is then supplied to balance modulator 71 by way of phase inverter 77. The other output signal of phase splitter 76 is supplied to modulator 72 by way of phase inverter 78. Again as in the arrangement of FIGURE 1, dynamic clamp circuits 79 and 80 are provided for insuring the transmission of the D.-C. components of the phase inverted chromaticity signals to the balanced modulator inputs. Each balanced modulator is then operative, in the manner described in detail in connection with FIGURE 1, to produce a sine wave output signal whose positive and negative excursions from its zero amplitude reference level are equal and controlled by the $(X-Y)$ and $(Z-Y)$ chromaticity signal components, respectively. For this purpose, each of the balanced modulators may be substantially similar in construction and operation to any one of the balanced modulators of FIGURE 1. The modulated signals appearing at the output circuits of modulators 71 and 72 are then combined with the band limited Y signal from camera unit 63 by means of adding circuit 81 which may be identical to adder 30 of FIGURE 1. As in the system of FIGURE 1, the output of adder 81 is used to modulate a transmitter 82 to which are also applied horizontal and vertical synchronizing pulses respectively derived from the generators 83 and 84 and a sub-carrier phase reference burst derived from sub-carrier source 75 through adder 85.

As in the case of the system of FIGURE 1, a low-pass filter 86 transmissive of signals in the 0 to 3 megacycle frequency range may be incorporated in the output of the monochrome or Y signal channel so as to limit the range of monochrome frequency components to 3 megacycles. The frequency of the signal produced by sub-carrier source 75 may then conveniently be located at 3.5 megacycles, thereby insuring the location of the brightness signal and of the modulation sidebands produced by the color difference signals in mutually exclusive frequency bands, the latter being located in the 3 to 4 megacycle frequency band. The composite signal produced at the output terminals of adder 81 by the system of FIGURE 3 again comprises a signal whose average value is representative of monochrome information, there being superimposed thereon a ripple of 3.5 megacycle nominal frequency which is phase and amplitude modulated in accordance with chromaticity information respecting the televised scene as produced by the additive combination of the outputs from modulators 71 and 72. The signal thus formed may, after transmission and reception in accordance with usual practice, be directly applied to the beam intensity control grid electrode of a standard monochrome television receiver where it will produce a high quality black-and-white image of the televised scene. Again this reproduction can be further improved by the incorporation, if desired, of a filter in the black-and-white receiver which is arranged to suppress the aforementioned ripple representative of chromaticity information.

As for the utilization of the signal in producing a color image, this may be accomplished by applying it to a receiver system somewhat analogous to that of FIGURE 2 but now operative to reconstitute the original Y, X and Z signal components followed by utilization of these separated components to actuate suitable separate image reproducers. This reconstitution of the original signals may, for example, be carried out by first separating the Y signal from the color difference signals by means of an appropriate low-pass filter and then demodulating the chromaticity signals by beating the 3 to 4 megacycle components in separate channels with each of two quadrature related 3.5 megacycle demodulating signals which latter are phase synchronized with the modulating signal utilized in the transmitter by means of the transmitted color synchronizing bursts. Such a receiver may utilize my sine wave balanced demodulation technique as described in connection with FIGURE 2. Alternatively, the composite signal produced by the transmitter system of FIGURE 3 is readily applicable to a receiver of the type described in the copending U.S. patent application of Robert C. Moore, Serial No. 214,995, filed March 10, 1951, now Patent No. 2,833,852, and assigned to the assignee of the present invention. In that system, a received signal of the form of the composite signal produced by the transmitter system of FIGURE 3 is utilized to produce a colored image on the screen of a single cathode ray tube, without even attempting to reconstitute the original separate monochrome and chromaticity components. Instead, the composite signal proper is utilized to control the beam intensity of a cathode ray tube which has a screen formed of minute juxtaposed elements fluorescent in the three primary colors and across which the beam is swept so as to impinge upon elements of a particular color at the times when the signal controlled beam intensity is representative of information respecting this color. Details of how this is accomplished are presented in the above-identified copending application of Robert C. Moore and need not be repeated here, as this technique has no direct bearing on the present invention.

As will be apparent, my inventive concept may be embodied by those skilled in the art in systems other than those herein illustrated. Therefore, I desire the scope of this concept to be limited only by the appended claims.

I claim:

1. A color television system comprising: means for producing a signal representative of variations in monochromatic intelligence of successively scanned portions of a televised scene; means for producing a plurality of signals respectively representative of different chromaticity components of said successively scanned portions; a source of a plurality of alternating signals of a single equal frequency and mutually different phases; means for utilizing different ones of said chromaticity representative signals to modulate different ones of said alternating signals to produce signals, each having fixed average value and each having a single, alternating component whose excursions on both sides of its respective fixed average value are substantially equally affected by variations in its respective chromaticity representative signal; and means for additively combining said signal representative of monochromatic intelligence and said produced alternating signals for transmission to a receiver.

2. A color television system comprising: means for producing a signal representative of variations in monochromatic intelligence of successively scanned portions of a televised scene; means for producing a plurality of signals respectively representative of different chromaticity components of said successively scanned portions; a source of a plurality of alternating signals of a single equal frequency and mutually different phases; means for utilizing different ones of said chromaticity representative signals to modulate different ones of said alternating signals to produce signals, each having fixed average value and each having a single, alternating component whose excursions on both sides of its respective fixed average value are substantially zero when respective ones of said chromaticity representative signals are of zero amplitude and are substantially equally determined by said chromaticity representative signals when said last-named signals are of finite amplitude; and means for additively combining said signal representative of monochromatic intelligence and said produced alternating signals for transmission to a receiver.

3. A color television system comprising: means for producing a signal representative of variations in monochromatic intelligence of successively scanned portions of a televised scene; means for producing a plurality of signals respectively representative of different chromaticity components of said successively scanned portions; a source of a plurality of alternating signals of a single equal frequency and mutually different phases; means for utilizing different ones of said chromaticity representative signals to modulate different ones of said alternating signals to produce signals, each having fixed average value and each having a single, alternating component whose excursions on both sides of its respective fixed average value are substantially equal to each other and proportional to the amplitude of its respective chromaticity indicative signal; and means for additively combining said signal representative of monochromatic intelligence and said produced alternating signals for transmission to a receiver.

4. A color television system comprising: means for producing a signal representative of variations in monochromatic intelligence of successively scanned portions of a televised scene; means for producing a plurality of signals respectively representative of different chromaticity components of said successively scanned portions; a source of a plurality of alternating signals of a single frequency and of mutually different phases; means for producing a signal of said predetermined frequency and of reference phase for said plurality of alternating signals; means for utilizing different ones of said chromaticity representative signals to modulate different ones of said alternating signals to produce signals, each having fixed average value and each having a single, alternating component whose excursions on both sides of its respective fixed average value are substantially equally affected by variations in its respective chromaticity representative signal; and means for transmitting said signal representative of monochromatic intelligence, said produced alternating signals and said signals of reference phase.

5. A color television system comprising: means for producing a signal representative of the monochromatic intelligence of a televised scene; means for limiting the variations in said signal to a predetermined low frequency range; means for producing a plurality of signals representative of different chromaticity components of said scene; means for limiting variations in each of said last-named signals to a low frequency range extending over a fraction of the low frequency range to which said signal representative of monochromatic intelligence is limited; a source of a plurality of alternating signals only all of a frequency exceeding the upper limit of said last-named low frequency range by substantially the width of the frequency range to which each said chromaticity representative signal is limited, said alternating signals having predetermined mutual phase relationships; means for utilizing different ones of said frequency-limited chromaticity representative signals to modulate different ones of said alternating signals so as to produce alternating signals whose excursions on both sides of their respective zero amplitude reference levels are substantially equally affected by variations in said chromaticity representative signals; means for additively combining said produced alternating signals with said frequency-limited signal representative of monochromatic intelligence; means for transmitting said combined signals to a receiver; and means for utilizing said combined signals at said receiver to reproduce a colored image of said televised scene.

6. A color television system comprising: means for producing a signal representative of the monochromatic intelligence of a televised scene, means for limiting the variations in said signal to a predetermined low frequency range, means for producing a plurality of signals representative of different chromaticity components of said scene; means for limiting variations in each of said last-named signals to a low frequency range extending over a fraction of the low frequency range to which said signal representative of monochromatic intelligence is limited; a source of a plurality of alternating signals only, all of a frequency exceeding the upper limit of said last-named low frequency range by substantially the width of the frequency range to which each said chromaticity representative signal is limited, said alternating signals having predetermined mutual phase relationships; means for utilizing different ones of said frequency-limited chromaticity representative signals to modulate different ones of said alternating signals so as to produce alternating signals whose excursions on both sides of their respective zero amplitude reference levels are equally affected by variations in said chromaticity representative signals; means for additively combining said produced alternating signals with said frequency-limited signal representative of monochromatic intelligence; means for producing an alternating signal of the frequency of said plurality of alternating signals and of reference phase relative to the phases of said plurality of alternating signals; means for transmitting said combined signals and said signal of reference phase to a receiver; and means for utilizing said combined signals and said signal of reference phase at said receiver to reproduce a colored image of said televised scene.

7. A color television system comprising: means for producing a signal representative of the monochromatic intelligence of a televised scene; means for limiting the variations in said signal to a predetermined low frequency range; means for producing a plurality of signals representative of different chromaticity components of said scene; means for limiting variations in each of said last-named signals to a low frequency range extending over a fraction of the low frequency range to which said signal representative of monochromatic intelligence is limited; a source of a first plurality of alternating signals only, all of a frequency exceeding the upper limit of said last-named low frequency range by substantially the width of the frequency range to which each said chromaticity representative signal is limited, said alternating signals having predetermined mutual phase relationships; means for producing a signal of the same frequency as said plurality of alternating signals and of reference phase for said alternating signals; means for utilizing different ones of said frequency-limited chromaticity signals to modulate different ones of said alternating signals so as to produce alternating signals whose excursions on both sides of their respective zero amplitude reference levels are substantially equally affected by variations in said chromaticity representative signals; means for transmitting said produced alternating signals, said frequency-limited signal representative of monochromatic intelligence and said signal of reference phase to a receiver; means at said receiver for producing a second plurality of alternating signals only, all of the frequency of said signal of reference phase, different ones of said signals having substantially said predetermined mutual phase relationships of said first plurality of alternating signals and also having substantially the same phases relative to said signal of reference phase as said first plurality of alternating signals; means at said receiver for utilizing all of said transmitted alternating signals jointly to modulate each of said second plurality of alternating signals so as to produce separate signals, respectively of predominantly the same forms as said signals representative of different chromaticity components of said televised scene; and means at said receiver for utilizing said receiver produced separate signals and said transmitted signal representative of monochromatic intelligence to reproduce a colored image of said televised scene.

8. A color television system comprising: means for producing a signal representative of variations in monochromatic intelligence of successively scanned portions of a televised scene; means for producing a plurality of signals respectively representative of different chromaticity components of said successively scanned scene; a source of a plurality of alternating signals only, all of predetermined equal frequency and mutually different phases; a plurality of signal modulators, each comprised of a pair of multigrid vacuum tubes having output circuits connected in signal additive relation; means for supplying different ones of said chromaticity representative signals to different ones of said modulators in push-pull relation; means for supplying different ones of said alternating signals to different ones of said modulators, also in push-pull relation; and means for additively combining the output signals from said modulators with said signal representative of monochromatic intelligence for transmission to a receiver.

9. A color television system comprising: means for producing a signal representative of variations in monochromatic intelligence of successively scanned portions of a televised scene; means for producing a plurality of signals respectively representative of different chromaticity components of said successively scanned portions; a source of a plurality of alternating signals of a signal equal frequency and mutually different phases; a plurality of modulator means, each having a pair of input circuits and a single output circuit; means for supplying different ones of said chromaticity representative signals to one input circuit of different ones of said modulator means, respectively; means for supplying different ones of said alternating signals to the other input circuit of different ones of said modulator means, respectively, each of said modulator means being responsive to the application of only one of said signals to reproduce all frequency components of said last-named signal at its output circuit and each of said modulator means being responsive to the application of both said signals to produce at its output circuit an alternating signal having fixed average value and having a single, alternating component whose excursions on both sides of its fixed average value are substantially equally affected by variations in the supplied chromaticity representative signal; and means for additively combining said signal representative of monochromatic intelligence and the alternating signals produced by each of said modulator means for transmission to a receiver.

10. A color television system comprising: means for producing a signal representative of variations in monochromatic intelligence of successively scanned portions of a televised scene; means for producing a plurality of signals respectively representative of different chromaticity components of said successively scanned portions; a source of a plurality of alternating signals of a single equal frequency and mutually different phases; a plurality of modulator means, each having a pair of input circuits and a single output circuit; means for supplying different ones of said chromaticity representative signals to one input circuit of different ones of said modulator means, respectively; means for supplying different ones of said alternating signals to the other input circuit of different ones of said modulator means, respectively, each of said modulator means being responsive to the application of only one of said signals to reproduce all frequency components of said last-named signal at its output circuit and each of said modulator means being responsive to the application of both said signals to produce at its output connection an alternating signal having a fixed average value and having a single, alternating component whose excursions on both sides of its fixed average value are substantially zero when respective ones of said chromaticity representative signals are of zero amplitude and are substantially equally determined by the supplied chromaticity representative signal when said last-named signal is of finite amplitude; and means for additively combining said signal representative of monochromatic intelligence and said produced alternating signals for transmission to a receiver.

11. A color television system comprising: means for producing a signal representative of variations in monochromatic intelligence of successively scanned portions of a televised scene; means for producing a plurality of signals respectively representative of different chromaticity components of said successively scanned portions; a source of a plurality of alternating signals of a single equal frequency and mutually different phases; non-frequency responsive means for utilizing different ones of said chromaticity representative signals to modulate different ones of said alternating signals to produce signals, each having fixed average value and each having a single, alternating component whose excursions on both sides of its respective fixed average value are substantially equally affected by variations in its respective chromaticity representative signal; and means for additively combining said signal representative of monochromatic intelligence and said produced alternating signals for transmission to a receiver.

12. A color television system comprising: means for producing a signal representative of variations in monochromatic intelligence of successively scanned portions of a televised scene; means for producing a plurality of signals respectively representative of different chromaticity components of said successively scanned portions; a source of a plurality of alternating signals of a single equal frequency and mutually different phases; non-frequency responsive means for utilizing different ones of said chromaticity representative signals to modulate different ones of said alternating signals to produce signals, each having fixed average value and each having a single, alternating component whose excursions on both sides of its respective fixed average value are substantially zero when respective ones of said chromaticity representative signals are of zero amplitude and are substantially equally determined by said chromaticity representative signals when said last-named signals are of finite amplitude; and means for additively combining said signal representative of monochromatic intelligence and said produced alternating signals for transmission to a receiver.

13. In a color television system, means for producing a plurality of signals respectively representative of different chromaticity components of successively scanned portions of a televised scene, means for producing a corresponding plurality of alternating signals having the same frequency but different phases, a corresponding plurality of balanced modulators, means for supplying said chromaticity representative signals respectively to said modulators, means for supplying said alternating signals respectively to said modulators, each of said modulators being balanced at least with respect to the chromaticity representative signal supplied thereto, and means for additively combining the outputs of said modulators to produce a resultant signal which is modulated in phase and amplitude according to the hue and saturation of said chromaticity components.

14. In a color television system, means for producing a plurality of signals respectively representative of different chromaticity components of successively scanned portions of a televised scene, means for producing a corresponding plurality of alternating signals having the same frequency but different phases, a corresponding plurality of balanced modulators, means for supplying said chromaticity representative signals respectively to said modulators, means for supplying said alternating signals respectively to said modulators, each of said modulators being balanced at least with respect to the alternating signal supplied thereto, and means for additively combining the outputs of said moulators to produce a resultant signal which is modulated in phase and amplitude according to the hue and saturation of said chromaticity components.

15. In a color television system, means for producing a plurality of signals respectively representative of different chromaticity components of successively scanned portions of a televised scene, means for producing a corresponding plurality of alternating signals having the same frequency but different phases, a corresponding plurality of balanced modulators, means for supplying said chromaticity representative signals respectively to said modulators, means for supplying said alternating signals respectively to said modulators, each of said modulators being balanced with respect to both the chromaticity representative signal and the alternating signal supplied thereto, and means for additively combining the outputs of said modulators to produce a resultant signal which is modulated in phase and amplitude according to the hue and saturation of said chromaticity components.

16. In a color television system, means for producing a signal representative of variations in monochromatic intelligence of successively scanned portions of a televised scene, means for producing a plurality of signals respectively representative of different chromaticity components of said successively scanned portions, means for producing a corresponding plurality of alternating signals having the same frequency but different phases, a corresponding plurality of balanced modulators, means for supplying said chromaticity representative signals respectively to said modulators, means for supplying said alternating signals respectively to said modulators, each of said modulators being balanced at least with respect to the chromaticity representative signal supplied thereto, and means for additively combining said signal representative of monochromatic intelligence and the outputs of said modulators to produce a composite signal having monochrome and chrominance components.

17. In a color television system, means for producing a signal representative of variations in monochromatic intelligence of successively scanned portions of a televised scene, means for producing a plurality of signals respectively representative of different chromaticity components of said successively scanned portions, means for producing a corresponding plurality of alternating signals having the same frequency but different phases, a corresponding plurality of balanced modulators, means for supplying said chromaticity representative signals respectively to said modulators, means for supplying said alternating signals respectively to said modulators, each of said modulators being balanced at least with respect to alternating signal supplied thereto, and means for additively combining said signal representative of monochromatic intelligence and the outputs of said modulators to produce a composite signal having monochrome and chrominance components.

18. In a color television system, means for producing a signal representative of variations in monochromatic intelligence of successively scanned portions of a televised scene, means for producing a plurality of signals respectively representative of different chromaticity components of said successively scanned portions, means for producing a corresponding plurality of alternating signals having the same frequency but different phases, a corresponding plurality of balanced modulators, means for supplying said chromaticity representative signals respectively to said modulators, means for supplying said alternating signals respectively to said modulators, each of said modulators being balanced with respect to both the chromaticity representative signal and the alternating signal supplied thereto, and means for additively combing said signal representative of monochromatic intelligence and the outputs of said modulators to produce a composite signal having monochrome and chrominance components.

References Cited in the file of this patent

UNITED STATES PATENTS 2,663,756 Kalfaian -------------- Dec. 22, 1953

OTHER REFERENCES

"Synchronization for Color Dot Interlace in the RCA Color Television System," RCA Bulletin on Color Television, October 1949, pages 4–10.

"A Six-Megacycle Compatible High-Definition Color Television System," RCA Review; December 1949, pages 504–524.